United States Patent
Ying et al.

(10) Patent No.: US 11,411,862 B2
(45) Date of Patent: Aug. 9, 2022

(54) METHOD, ELECTRONIC DEVICE AND COMPUTER-READABLE MEDIUM FOR PROCESSING DATA GENERATED BY SERVICE

(71) Applicant: EMC IP Holding Company LLC, Hopkinton, MA (US)

(72) Inventors: Zhi Ying, Shanghai (CN); Kun Wang, Beijing (CN); Jinpeng Liu, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 348 days.

(21) Appl. No.: 16/403,756

(22) Filed: May 6, 2019

(65) Prior Publication Data
US 2020/0252332 A1    Aug. 6, 2020

(30) Foreign Application Priority Data
Jan. 31, 2019  (CN) .......................... 201910100375.8

(51) Int. Cl.
*H04L 45/302* (2022.01)
*H04L 45/50* (2022.01)
*H04L 47/2408* (2022.01)
*H04L 67/51* (2022.01)

(52) U.S. Cl.
CPC .......... *H04L 45/302* (2013.01); *H04L 45/507* (2013.01); *H04L 47/2408* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 8,693,323 B1* | 4/2014 | McDysan | H04L 45/50 370/230 |
| 10,567,293 B1* | 2/2020 | Pularikkal | H04L 47/2491 |
| 2017/0244631 A1* | 8/2017 | Guichard | H04L 45/50 |

* cited by examiner

*Primary Examiner* — Ayaz R Sheikh
*Assistant Examiner* — Sori A Aga
(74) *Attorney, Agent, or Firm* — Ryan, Mason & Lewis, LLP (57) ABSTRACT

Embodiments of the present disclosure provide a method, electronic device and computer-readable medium for processing data generated by a service. The method disclosed herein comprises: obtaining a data packet generated by a service; identifying whether the service generating the data packet is a predetermined service for which a routing path is to be set; in response to identifying that the service is the predetermined service, attaching an indication of the routing path to the data packet. In this way, the embodiments of the present disclosure can provide different routing paths for data packets generated by services, thereby increasing transfer efficiency of data packets.

20 Claims, 5 Drawing Sheets

METHOD, ELECTRONIC DEVICE AND COMPUTER-READABLE MEDIUM FOR PROCESSING DATA GENERATED BY SERVICE

RELATED APPLICATION(S)

The present application claims priority to Chinese Patent Application No. 201910100375.8, filed Jan. 31, 2019, and entitled "Method, Electronic Device, and Computer-Readable Medium for Processing Data Generated by Service," which is incorporated by reference herein in its entirety.

FIELD

Embodiments of the present disclosure relate to a field of data processing, and more specifically, to a method, electronic device and computer-readable medium for processing data generated by a service.

BACKGROUND

With the rapid development of information technology, electronic devices are widely used to provide various services to users, and an amount of data exchange between services provided by each electronic device is usually required. As electronic devices are able to provide more and more services, communication between management services becomes more and more important. Therefore, various modes of communication between services have been proposed and have been widely used in practical applications.

Service Mesh is a configurable infrastructure layer for services. Service Mesh provides functions, such as service discovery, load balancing, encryption, authentication and authorization, without knowing specific attributes and information of a network. However, as the types of services increases, different services have different kinds of network requirements, for example, some services require lower data transfer delays, while others require greater data transfer bandwidth. Because the existing Service Mesh lacks management of the network, it is difficult to simultaneously meet the network requirements required by different services.

SUMMARY

Embodiments of the present disclosure provide a method, electronic device and computer-readable medium for processing data generated by a service.

In accordance with the first aspect of the present disclosure, a method is provided for processing data generated by a service. The method comprises: obtaining a data packet generated by the service; identifying whether the service generating the data packet is a predetermined service for which a routing path is to be set; and in response to identifying that the service is the predetermined service, attaching an indication of the routing path to the data packet.

In accordance with the second aspect of the present disclosure, an electronic device is provided for processing data generated by a service. The electronic device comprises: a processor; and a memory, storing computer program instructions. The processor executes the computer program instructions in the memory to control the electronic device to perform acts comprising: obtaining a data packet generated by the service; identifying whether the service generating the data packet is a predetermined service for which a routing path is to be set; and in response to identifying that the service is the predetermined service, attaching an indication of the routing path to the data packet.

In accordance with the third aspect of the present disclosure, a computer readable medium is provided. The computer readable medium comprises computer programs stored thereon, the computer programs when executed by a processor implements the method according to the first aspect of the present application.

It is to be understood that this Summary is not intended to identify key or important features of embodiments of the present disclosure, or to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of embodiments of the present disclosure will become more apparent. Several embodiments of the present disclosure will be illustrated by way of example but not limitation in the drawings, in which.

DETAILED DESCRIPTION

Concepts of the present disclosure will now be described with reference to various example embodiments illustrated in the drawings. It should be understood that description of those embodiments is merely to enable those skilled in the art to better understand and further implement example embodiments disclosed herein and is not intended to limit the scope disclosed herein in any manner. It should be noted that similar or identical reference numerals may be used in the drawings where possible and similar or identical reference numerals may indicate similar or identical elements. Those skilled in the art will appreciate that alternative embodiments of the structures and/or methods described herein may be employed without departing from the principles and concepts of the present disclosure.

As used herein, the term "includes" and its variants are to be read as open-ended terms that mean "includes, but is not limited to." The term "based on" is to be read as "based at least in part on." The term "one example embodiment" is to be read as "at least one example embodiment" and term "another example embodiment" is to be read as "at least one another example embodiment." Other terms that may occur but are not mentioned herein are not to be interpreted or limited in a manner that is contrary to the concept on which the embodiments of the present disclosure are based, unless explicitly stated.

As described above, when the services provided by the respective electronic devices are in mutual communication, the data transfer status in the network is unknown. Taking Service Mesh as an example, Service Mesh usually assumes that underlying network is flat, that is, the network has equal performance across all connections from service to service. There is no ability to change or improve the network status for Service Mesh. Therefore, the routing path that various data from different services passes through during transfer is completely controlled by the routing protocol of the routing node in the network path. Usually, the path is selected to be the shortest routing path.

However, for a practical application, the shortest routing path is not necessarily the best routing path. In order to improve the quality of services, it is often necessary to define different routing paths for different services. In some examples, request-based services (e.g., an online game) typically require lower network delay to improve user experience while file transfer-based services (e.g., video playback) require less on network delay, but require greater network bandwidth. Due to the lack of management of the network, the current Service Mesh technologies cannot achieve various network demands of different services at the same time.

In addition, in some cases, a routing path in the network may experience hardware failure or congestion, resulting in greatly reduced efficiency of data transfer through the path. However, Service Mesh will just follow the default network routing path to transfer data and cannot make the data select another better path. Therefore, the overall transfer efficiency of the data will be significantly reduced.

In order to at least partially solve the above and potentially other problems, embodiments of the present disclosure propose a solution for processing data generated by services. The solution is able to obtain data packets generated by services. In the solution, indications of the routing path are attached or added to the packets when services generating packet are identified as the predetermined service that needs to set a routing path. In this way, the solution can provide different packet routing paths for different services according to the network transfer requirements of different services and the congestion condition in the network and thus, improve the quality of service.

The basic principles and implementations of the present disclosure are described below with reference to the accompanying drawings. It should be understood that scope of the present invention is not limited to the embodiments described in the present disclosure, but the present disclosure enables those skilled in the art to understand and implement the embodiments described in the present disclosure.

Figure 1:
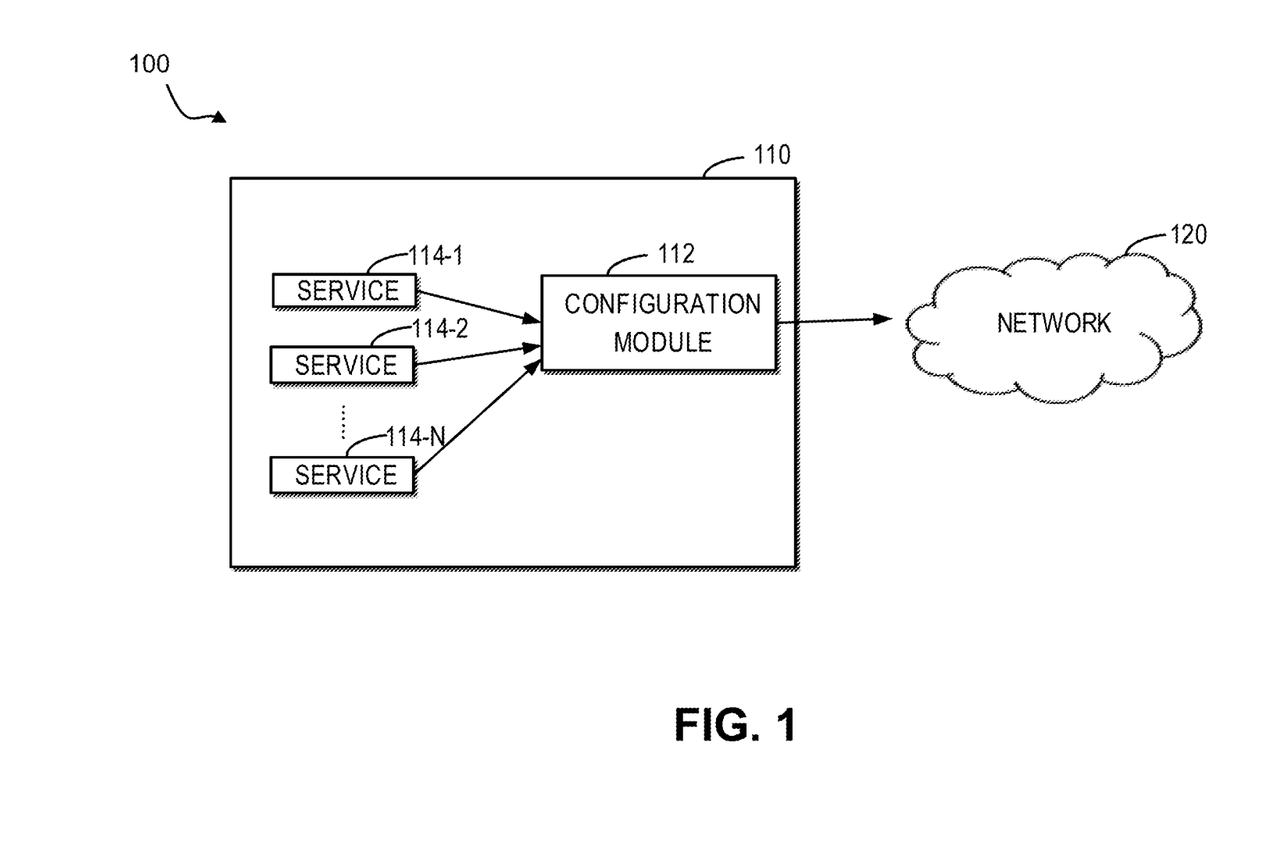
FIG. 1 illustrates a schematic diagram of example environment 100 for processing data generated by a service according to an embodiment of the present disclosure.

FIG. 1 illustrates a schematic diagram of example environment 100 for processing data generated by a server according to one embodiment of the present disclosure. As shown in FIG. 1, environment 100 includes an electronic device 110 and a network 120, and the electronic device 110 can transfer data with other devices or services over network 120. The network 120 may be a wired network, a wireless network, or a combination of a wired network and a wireless network. For example, the network 120 may include, but is not limited to, Internet, a wide area network, a metropolitan area network, a local area network, a virtual private network (VPN) network, a wireless communication network, and many more.

The electronic device 110 is a computing device capable of providing services, and it can be a computer, a server, or any other device that can be used to provide services. The electronic device 110, as a node in the network 120, can exchange data with any other node in the network. Although one electronic device is shown in FIG. 1, it should be understood that this is for illustrative purposes only and is not intended to limit the scope of the disclosure. In some embodiments, the electronic device 110 can include a different number of electronic devices and/or electronic devices with different functionality.

As shown in FIG. 1, the electronic device 110 may provide one or more services 114-1, 114-2, . . . , 114-N (collectively referred to as service 114) and N is a positive integer greater than one. The service 114 can provide various types of services to the user, such as online games, video playback, online shopping, and the like. The scope of the present disclosure is not limited thereto.

The electronic device 110 also includes a configuration module 112, which is a software module that can be configured by a processor. Service 114 exchanges data with other devices in network 120 through configuration module 112. In some implementations, the configuration module 112 identifies different services based on pre-set configuration information. The configuration information can be set by the user or by any application or program or service. The above examples are for illustrative purposes only and are not intended to limit the disclosure. The configuration information can be obtained in any suitable manner and set in any suitable manner.

In some embodiments, configuration module 112 can attach an indication of a routing path to data packets generated by services based on the configuration information. A data packet to which such an indication is attached is transferred to the target device via the network 120. In some embodiments, the network 120 is composed of one or more routing nodes, and the network 120 can route data packets to the target device through a routing path composed of routing nodes, thereby enabling high efficiency transfer of data packets.

Figure 2:
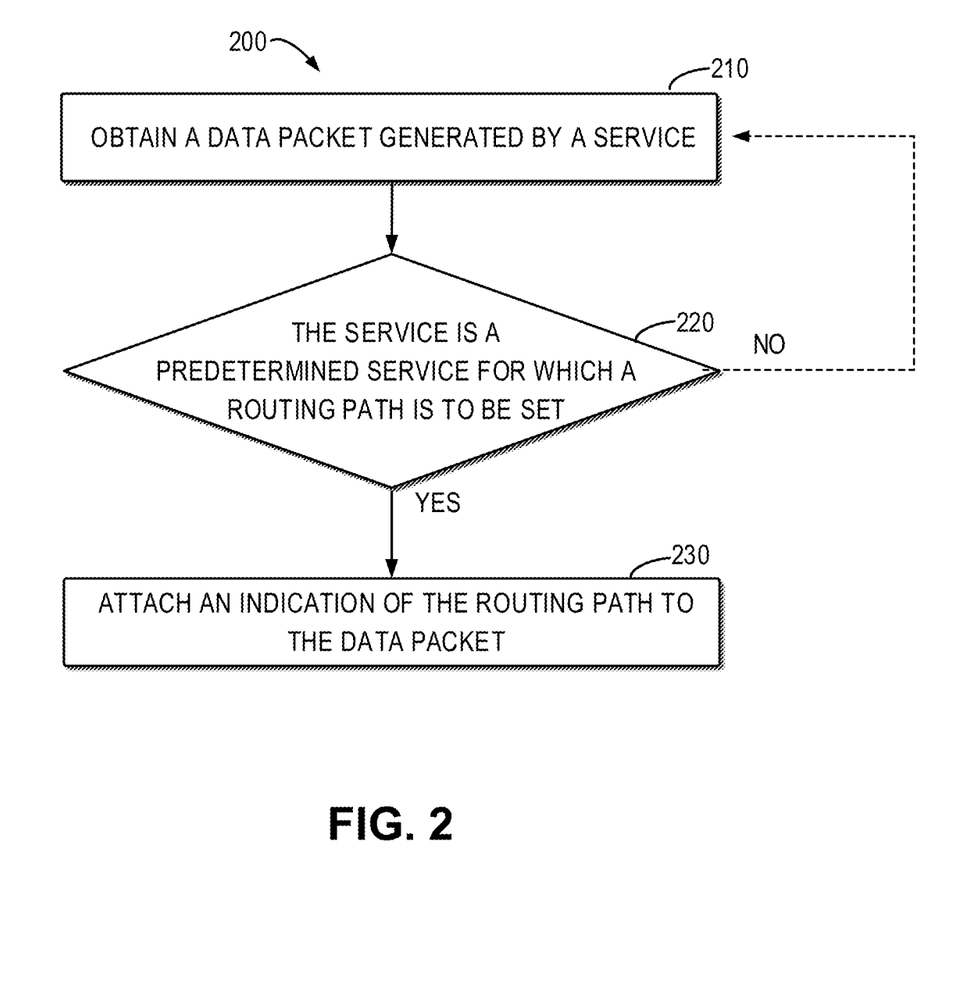
FIG. 2 illustrates a flow diagram of method 200 for processing data generated by a service according to an embodiment of the present disclosure.

FIG. 2 illustrates a flow diagram of a method 200 for processing data generated by server according to one embodiment of the present disclosure. It should be understood that at least a portion of the method 200 can be performed by the electronic device 110 described above with respect to FIG. 1. The method 200 may also include blocks not shown and/or the blocks shown may be omitted. The scope of the disclosure is not limited in this respect.

At block 210, the configuration module 112 obtains the data packets generated by service 114. The data packet is to be transferred to the target device via one or more routing nodes in network 120. In some embodiments, to increase the transfer speed of the data packet, the configuration module 112 can directly obtain each data packet generated by the service 114.

However, in a practical application process, the service 114 may generate some invalid data packets, for example, the generated data packets may be incomplete, or the generated data packets may have been tampered with by other applications or programs. Thus, alternatively or additionally, in some embodiments, configuration module 112 can verify the validity of the data packets generated by the service 114. If the packet is verified to be valid, the packet is obtained; if the packet is verified to be invalid, the packet is discarded. It should be understood that verifying whether the data packet is valid may be performed by any suitable means, for example, verifying whether the data packet is complete, or whether the data packet has been tampered with, etc., and the scope of the present disclosure is not limited thereto.

At block 220, the configuration module 112 identifies whether the service 114 that generates the data packet is a predetermined service for which a routing path is to be set. In some embodiments, configuration module 112 can determine whether the identifier of the service 114 is included in the data packet obtained at block 210. The identifier can be any suitable identifier, such as different address information for different services, or different tags set for different services.

In some embodiments, if it is determined that the identifier of the service 114 is included in the data packet, then the identifier is compared to a predetermined identifier in the configuration information. In some embodiments, the configuration information further includes an indication of a routing path associated with the predetermined identifier. The indication of the routing path may be set by any suitable means, for example, pre-set by the user, or configured by any application or program or service, etc., and the scope of the present disclosure is not limited thereto. If it is determined that the identifier of the service 114 matches the predetermined identifier in the configuration information, the service 114 is identified as the predetermined service for which a routing path is to be set. In this way, the routing path that satisfies the requirement can be associated with the corresponding service according to the different requirements of the different services to the network.

Alternatively or additionally, if the identifier of the service 114 does not match the predetermined identifier, the service 114 is identified as a service for which a routing path is not to be set.

At block 230, if the configuration module 112 identifies that the service 114 is a predetermined service for which a routing path is to be set at block 220, then an indication of the routing path associated with the service 114 is attached to the data packet. In some embodiments, configuration module 112 can read the indication of the routing path associated with the predetermined service from the configuration information and attach the indication of the routing path to the data packet. In this way, the routing node can transfer the data packet to the target device according to the indicated routing path, thereby improving transfer efficiency.

In some embodiments, the indication attached by the configuration module 112 to the data packet can include a label stack. Each label stack may include one or more labels, each label indicating a corresponding routing node to be passed on the routing path. In some embodiments, configuration module 112 may attach one or more labels indicating the routing path to the data packets generated by the service 114 as soon as it is identified that the service 114 is a predetermined service for which a routing path is to be set. In this way, the speed of packet transfer can be increased.

Alternatively or additionally, in some embodiments, after the configuration module 112 identifies that the service 114 is a predetermined service for which a routing path is to be set, the number of labels indicating the routing path may be determined first. The configuration module 112 can modify the size of the data packet based on the number, for example, if the number of labels to be attached is 50, the size of the data packet is increased to accommodate 50 labels. After the size of the data packet is modified, all the labels are attached to the data packet in a predetermined order. In this way, it is possible to avoid errors in the process of label addition due to size mismatch.

It will be understood that the "label" and "label stack" are merely examples and are not intended to limit the scope of the disclosure in any way. The configuration module 112 may also be configured to attach any indication of suitable form to a data packet, such as a mark, a data block, a piece of data, and the like. For ease of discussion, in the following description of the disclosure, "label" and "label stack" will still be taken as examples.

In some embodiments, the configuration module 112 can attach the label stack indicating the routing path to any suitable location in the data packet. For example, in order to be compatible with the Multi-Protocol Label Switching (MPLS) standard commonly used in existing networks, the label stack can be attached between Layer 2 and Layer 3 headers that conform to the MPLS standard. Since the existing routing nodes mostly support the MPLS standard, the routing node can directly identify the label stack without additional configuration, thereby facilitating the routing of the data packet.

Alternatively or additionally, in practical applications, sometimes there may be scenarios that are not suitable for routing packets using the MPLS standard, and in this case, the label stack can be attached to other locations of the data packet. However, existing routing nodes may have difficulty directly identifying the label stack. In this case, additional configuration of the routing node is required to enable the routing node to identify the label stack.

In some embodiments, the format of the label stack can be any suitable format. For example, if the format of the label stack is set to a format compatible with existing exchange protocols/standards, the routing node can directly identify the label stack without additional configuration. Alternatively or additionally, if the format of the label stack is customized to a format that is not compatible with existing exchange protocols/standards, additional configuration of the routing node is required to enable the routing node to identify the label stack.

When data is exchanged between the services of different devices via the network 120, the network 120 can determine different routing paths based on the indications attached in the data packets. Two examples of transferring data packets according to the indication of the routing path are described in detail below with reference to FIGS. 3 and 4.

Alternatively, or in addition, in some embodiments, if the service 114 is identified as a service for which a routing path is not to be set, then no indication is attached to the data packet. In such a case, the data packet will be transferred in network 120 via a default routing path. The default routing path may be determined by one or more data exchange protocols/standards used by the routing node, which is not limited in this disclosure.

Figure 3:
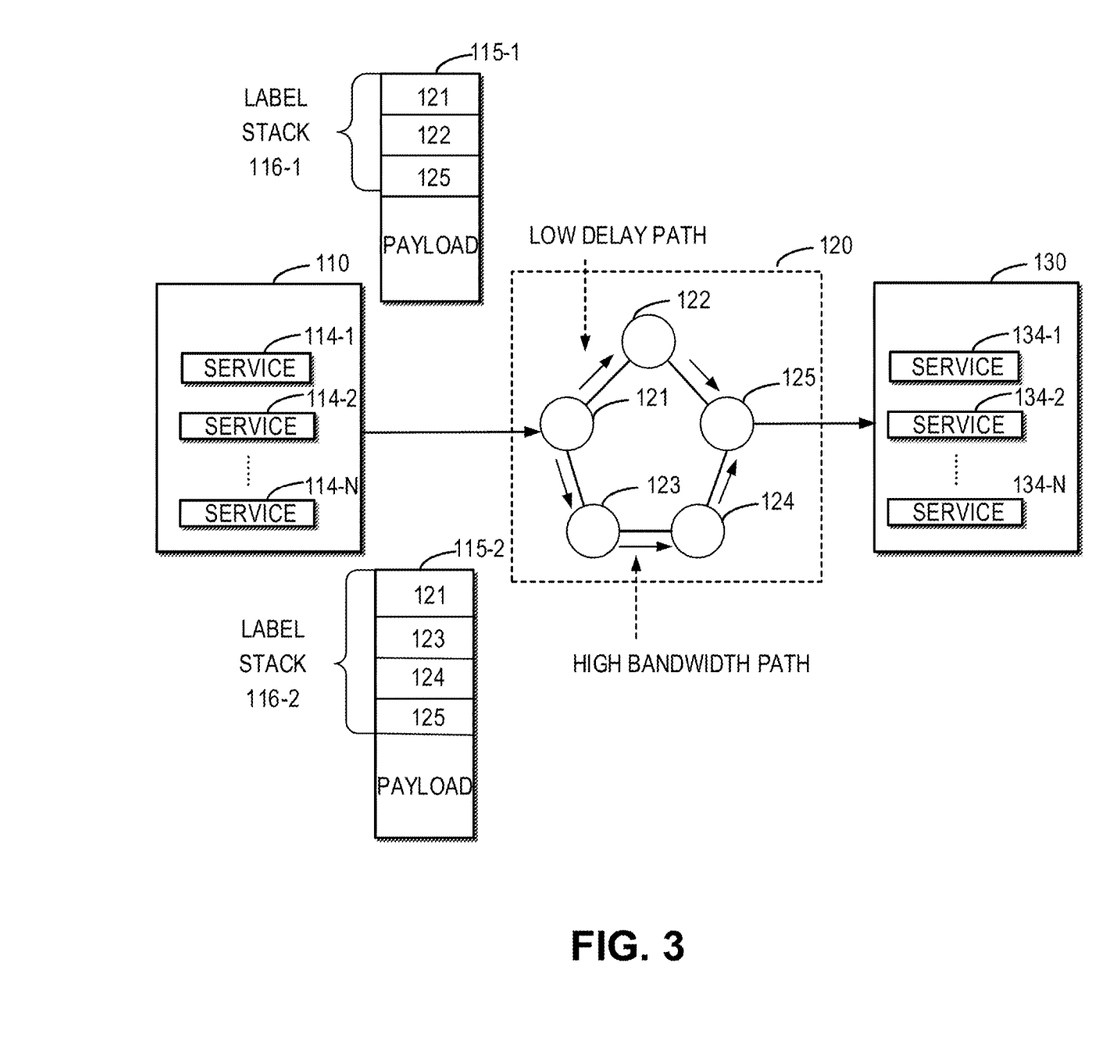
FIG. 3 illustrates a schematic diagram of transferring a data packet according to an indication of a routing path in accordance with an embodiment of the present disclosure.

In the example shown in FIG. 3, the electronic device 110 may provide service 114-1, 114-2, . . . , 114-N, and the data packet 115-1 and the data packet 115-2 are the data packets generated by the service 114-1 and service 114-2, respectively. The network 120 includes at least the routing nodes 121 to 125, the data packet 115-1 and the data packet 115-2 are to be routed to the target device 130 through the network 120, and the target device 130 can provide the services 134-1, 134-2, . . . , 134-N. Although two data packets and five routing nodes are shown in FIG. 3, it should be understood that this is for illustrative purposes only and is not intended to limit the scope of the disclosure. In some embodiments, the services 114-1, 114-2, . . . , 114-N may generate one or more data packets, and network 120 may include one or more routing nodes. It should be understood that electronic device 110 may also include some other modules and/or devices not shown in FIG. 3, such as configuration module 112 and the like.

In the example shown in FIG. 3, the service 114-1 is identified as a predetermined service (e.g., a network game)

requiring a low network delay, and therefore, the data packet 115-1 generated by the service 114-1 is attached a label stack 116-1 indicating the routing path with low network delay. The label stack 116-1 can include one or more labels. In this example, the label stack 116-1 includes three labels, each label indicating a respective routing node to be passed on the routing path.

In some embodiments, labels may be inserted into a data packet in a predetermined order to indicate the order of routing nodes to be passed on the routing path. For example, in FIG. 3, the three labels included in the label stack 116-1 are inserted into the data packet 115-1 in a predetermined order such that the label stack 116-1 indicates that the data packet 115-1 is routed to the target device 130 via the low network delay path with route nodes 121, 122, 125. When the packet 115-1 begins routing, the packet 115-1 is firstly sent to the routing node 121, which routes the data packet 115-1 to the routing node 122 as indicated by label stack 116-1. Upon receipt of the data packet 115-1, the routing node 122 continues to send the data packet 115-1 to the routing node 125 as indicated by the label stack 116-1 such that the data packet 115-1 is ultimately successfully routed to the target device 130. In this way, each routing node can sequentially route the data packet 115-1 to the next routing node according to the routing path indicated by the label insertion order without concerning the specific content contained in the valid payload (valid data to be actually transferred by the data packet) contained in the data packet 115-1, so as to achieve fast and efficient data transfer.

Still taking FIG. 3 as an example, the service 114-2 is identified as a predetermined service (e.g., video playback) that requires high network bandwidth. Therefore, the packet 115-2 generated by the service 114-2 is attached a label stack 116-2 indicating the routing path with high network bandwidth. In this example, the label stack 116-2 includes four labels, each label indicating a respective routing node to be passed on the routing path. The four labels included in the label stack 116-2 are inserted into the data packet 115-2 with a predetermined order, such that the label stack 116-2 indicates that the data packet 115-2 is routed to the target device 130 via the high network delay path with route nodes 121, 123, 124, 125. When the packet 115-2 begins routing, the packet 115-2 is firstly sent to the routing node 121, which routes the data packet 115-2 to the routing node 123 as indicated by the label stack 116-2. After receiving the data packet 115-2, the routing node 123 continuously sends the data packet 115-2 to the routing node 124 according to the indication of the label stack 116-2. After receiving the data packet 115-2, the routing node 124 further send the packet 115-2 to the routing node 125 according to the indication of the label stack 116-2 such that the packet 115-2 is ultimately successfully routed to the target device 130. In this manner, each routing node only needs to route the packet 115-2 to the target device 130 via the desired path with high network bandwidth in accordance with the routing path indicated by the label stack 116-2 without concerning the payload contained in packet 115-2.

Figure 4:
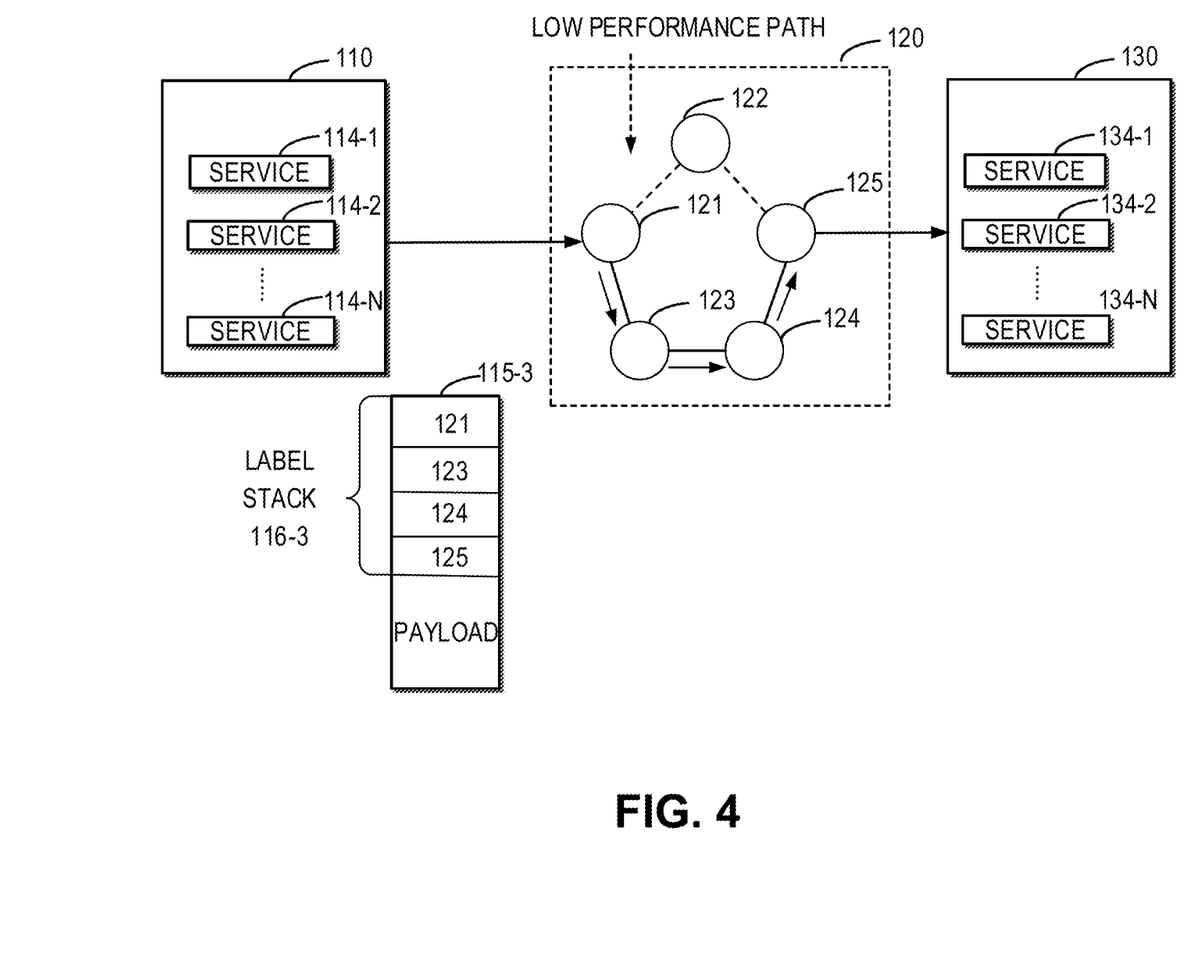
FIG. 4 illustrates another schematic diagram of transferring a data packet according to an indication of a routing path in accordance with an embodiment of the present disclosure.

In some embodiments, a routing path in the network 120 may cause hardware failure or congestion, etc., resulting in reduced routing performance. In such a case, the configuration module 112 can attach an indication to the data packet not to pass through the path, thereby reducing the likelihood of routing efficiency degradation due to network problems.

FIG. 4 illustrates another schematic diagram of transferring a data packet according to an indication of a routing path in accordance with an embodiment of the present disclosure. In the network 120, problems such as hardware failure or congestion occur in the routing path composed of the routing nodes 121, 122, and 125. The packet 115-3 was originally intended to be transferred over this path. In such a case, the configuration module 112 may attach a label stack 116-3 indicating other paths (e.g., paths consisting of routing nodes 121, 123, 124, 125) to the data packet 115-3. Based on the label stack 116-3, the network 120 can transfer the data packet 115-3 over a relatively fast path. In this way, it is possible to avoid routing packets in a path with lower transfer performance, thereby improving the overall routing efficiency of the data packet.

Figure 5:
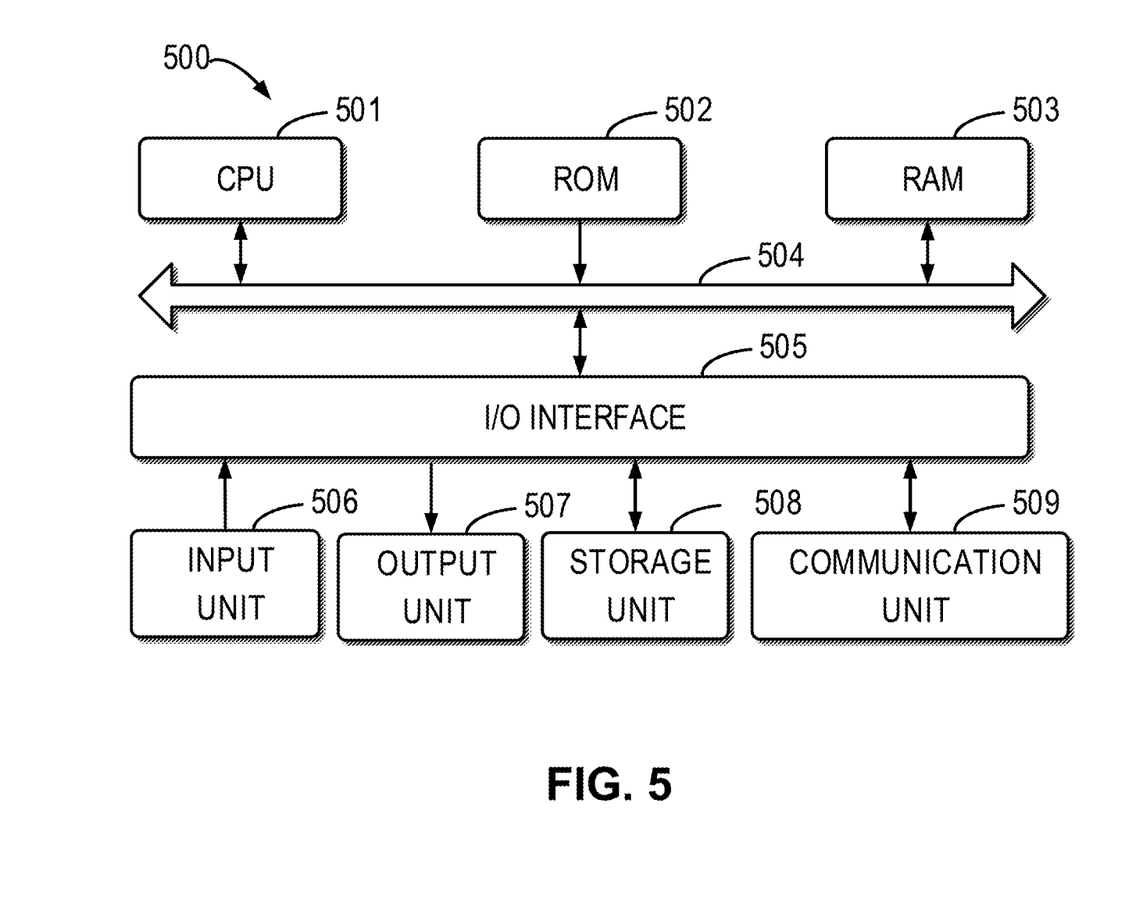
FIG. 5 illustrates a block diagram of a device 500 which can be used to implement embodiments of the present disclosure.

FIG. 5 illustrates a block diagram of a device 500 which can be used to implement embodiments of the present disclosure. The device 500 may be the electronic device 110 described above with respect to FIG. 1. As shown, the device 500 includes a central processing unit (CPU) 501 that can perform various appropriate actions and processes according to computer program instructions stored in read only memory (ROM) 502 or computer program instructions loaded from storage unit 508 into random access memory (RAM) 503. In the RAM 503, various programs and data required for the operation of the device 500 can also be stored. The CPU 501, the ROM 502, and the RAM 503 are connected to each other through a bus 504. An input/output (I/O) interface 505 is also coupled to bus 504.

A plurality of components in device 500 are coupled to I/O interface 505, including: input unit 506, such as a keyboard, mouse, etc.; output unit 507, such as various types of displays, speakers, etc.; storage unit 508, such as a disk and a CD, etc.; and a communication unit 509 such as a network card, a modem, a wireless communication transceiver, and the like. Communication unit 509 allows device 500 to exchange information/data with other devices over a computer network such as the Internet and/or various telecommunication networks.

The various methods or processes described above may be performed by CPU 501. For example, in some embodiments, a method can be implemented as a computer software program that is tangibly embodied in a machine readable medium, such as storage unit 508. In some embodiments, part of or the entire computer program may be loaded and/or installed onto device 500 via ROM 502 and/or communication unit 509. When a computer program is loaded into RAM 503 and executed by CPU 501, one or more of the steps or actions of the methods or processes described above may be performed.

In some embodiments, the methods and processes described above can be implemented as a computer program product. The computer program product can include a computer readable storage medium loaded with computer readable program instructions for performing various aspects of the present disclosure.

A computer readable storage medium may be a tangible device that can hold and store the instructions used by the instruction execution device. The computer readable storage medium can be, for example, but is not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, RAM, ROM, erasable programmable read only memory (EPROM) or flash memory), static random access memory (SRAM), portable compact disk read only memory (CD-ROM), digital versatile disk (DVD), memory stick, floppy disk, mechanical encoding device, for example, a hole card with instructions stored thereon or raised structure in a groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or an electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, as well as conventional procedural programming languages. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

These computer readable program instructions can be provided to a processing unit of a general purpose computer, a special purpose computer or other programmable data processing apparatus to produce a machine such that when the instructions are executed by the processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer program products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, and to enable those of ordinary skill in the art to understand the embodiments in the disclosure.

What is claimed is:

1. A method for processing data generated by a service, comprising:

obtaining, at an electronic device, a data packet generated by a service, wherein the service is part of a service mesh network comprised of a plurality of services associated with a plurality of electronic devices and configured to communicate with one another over the service mesh network;

identifying, at the electronic device, whether the service generating the data packet is a predetermined service for which a routing path is to be set; and in response to identifying that the service is the predetermined service, attaching, at the electronic device, an indication of the routing path to the data packet;

wherein attaching the indication of the routing path to the data packet comprises:

attaching one or more labels to the data packet, each label indicating a respective routing node to be passed on the routing path;

modifying a size of the data packet to accommodate the one or more of labels; and attaching the one or more labels to the data packet with the modified size.

2. The method of claim 1, wherein the identifying comprises:

determining whether an identifier of the service is included in the data packet;

in response to the identifier of the service being included in the data packet, determining whether the identifier of the service matches a predetermined identifier; and in response to the identifier of the service matching the predetermined identifier, identifying the service as the predetermined service for which the routing path is to be set.

3. The method of claim 2, wherein the identifier of the service comprises information concerning an address of the service.

4. The method of claim 2, wherein the identifier of the service comprises a tag set for the service, the tag indicates a type of the service.

5. The method of claim 1, wherein attaching the one or more labels to the data packet comprises:

inserting a plurality of labels into the data packet in a predetermined order.

6. The method of claim 1, wherein attaching the one or more labels to the data packet comprises:

determining a number of the one or more labels.

7. An electronic device for processing data generated by server, the electronic device comprising:

a processor; and a memory, storing computer program instructions, the processor executing the computer program instructions in the memory to control the electronic device to perform acts comprising:

obtaining, at an electronic device, a data packet generated by a service, wherein the service is part of a service mesh network comprised of a plurality of services associated with a plurality of electronic devices and configured to communicate with one another over the service mesh network;

identifying, at the electronic device, whether the service generating the data packet is a predetermined service for which a routing path is to be set; and in response to identifying that the service is the predetermined service, attaching, at the electronic device, an indication of the routing path to the data packet;

wherein attaching the indication of the routing path to the data packet comprises:

attaching one or more labels to the data packet, each label indicating a respective routing node to be passed on the routing path;

modifying a size of the data packet to accommodate the one or more of labels; and attaching the one or more labels to the data packet with the modified size.

8. The electronic device of claim 7, wherein the identifying comprises:

determining whether an identifier of the service is included in the data packet;

in response to the identifier of the service being included in the data packet, determining whether the identifier matches a predetermined identifier; and in response to the identifier of the service matching the predetermined identifier, identifying the service as the predetermined service for which the routing path is to be set.

9. The electronic device of claim 8, wherein the identifier of the service comprises information concerning an address of the service.

10. The electronic device of claim 8, wherein the identifier of the service comprises a tag set for the service, the tag indicates a type of the service.

11. The electronic device of claim 7, wherein attaching the one or more labels to the data packet comprises:

inserting a plurality of labels into the data packet in a predetermined order.

12. The electronic device of claim 7, wherein attaching the one or more labels to the data packet comprises:

determining a number of the one or more labels.

13. A computer readable medium comprising a non-transitory processor-readable storage medium having computer programs stored thereon, the computer programs when executed by the processor implementing a method for processing data generated by a service, comprising:

obtaining, at an electronic device, a data packet generated by a service, wherein the service is part of a service mesh network comprised of a plurality of services associated with a plurality of electronic devices and configured to communicate with one another over the service mesh network;

identifying at the electronic device, whether the service generating the data packet is a predetermined service for which a routing path is to be set; and in response to identifying that the service is the predetermined service, attaching, at the electronic device, an indication of the routing path to the data packet;

wherein attaching the indication of the routing path to the data packet comprises:

attaching one or more labels to the data packet, each label indicating a respective routing node to be passed on the routing path;

modifying a size of the data packet to accommodate the one or more of labels; and attaching the one or more labels to the data packet with the modified size.

14. The computer readable medium of claim 13, wherein the identifying comprises:

determining whether an identifier of the service is included in the data packet;

in response to the identifier of the service being included in the data packet, determining whether the identifier of the service matches a predetermined identifier; and in response to the identifier of the service matching the predetermined identifier, identifying the service as the predetermined service for which the routing path is to be set.

15. The computer readable medium of claim 14, wherein the identifier of the service comprises information concerning an address of the service.

16. The computer readable medium of claim 14, wherein the identifier of the service comprises a tag set for the service, the tag indicates a type of the service.

17. The computer readable medium of claim 13, wherein attaching the one or more labels to the data packet comprises:

determining a number of the one or more labels.

18. The method of claim 1, wherein modifying the size of the data packet includes increasing the size of the data packet.

19. The method of claim 1, further including:

identifying an additional service as a service for which a routing path is not to be set; and transferring a data packet associated with the additional service to a default routing path.

20. The electronic device of claim 7, further including:

identifying an additional service as a service for which a routing path is not to be set; and transferring a data packet associated with the additional service to a default routing path.

* * * * *

UNITED STATES PATENT AND TRADEMARK OFFICE
CERTIFICATE OF CORRECTION

PATENT NO. : 11,411,862 B2
APPLICATION NO. : 16/403756
DATED : August 9, 2022
INVENTOR(S) : Zhi Ying et al.

It is certified that error appears in the above-identified patent and that said Letters Patent is hereby corrected as shown below:

In the Claims

Claim 1, Column 10, Line 61, please delete "one or more of labels" and insert therefor --one or more labels--

Signed and Sealed this
Eleventh Day of October, 2022

Katherine Kelly Vidal
*Director of the United States Patent and Trademark Office*